United States Patent
Ramachandra et al.

(10) Patent No.: US 11,452,013 B2
(45) Date of Patent: Sep. 20, 2022

(54) RADIO NETWORK NODE, WIRELESS DEVICE AND METHODS PERFORMED THEREIN

(71) Applicant: TELEFONAKTIEBOLAGET LM ERICSSON (PUBL), Stockholm (SE)

(72) Inventors: Pradeepa Ramachandra, Linkoping (SE); Helka-Liina Määttanen, Helsinki (FI); Icaro L. J. Da Silva, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 49 days.

(21) Appl. No.: 16/623,195

(22) PCT Filed: Jun. 1, 2018

(86) PCT No.: PCT/SE2018/050562
§ 371 (c)(1),
(2) Date: Dec. 16, 2019

(87) PCT Pub. No.: WO2018/231123
PCT Pub. Date: Dec. 20, 2018

(65) Prior Publication Data
US 2021/0144604 A1  May 13, 2021

Related U.S. Application Data

(60) Provisional application No. 62/520,638, filed on Jun. 16, 2017.

(51) Int. Cl.
*H04W 36/00* (2009.01)
*H04B 7/06* (2006.01)
*H04W 24/10* (2009.01)

(52) U.S. Cl.
CPC .... *H04W 36/00837* (2018.08); *H04B 7/0617* (2013.01); *H04B 7/0626* (2013.01);
(Continued)

(58) Field of Classification Search
None
See application file for complete search history.

(56) References Cited

U.S. PATENT DOCUMENTS

2017/0208494 A1* 7/2017 Moon ................ H04L 5/0048
2019/0357069 A1* 11/2019 Harada ................ H04W 24/10

FOREIGN PATENT DOCUMENTS

WO   WO2016085266 A1   6/2016

OTHER PUBLICATIONS

Huawei et al., "Models Considering Beamforming", 3GPP Draft; R2-1705526, 3rd Generation Partnership Project (3GPP), Mobile Competence Centre ; 650, Route Des Lucioles ; F-06921 Sophia-Antipolis Cedex ; France. May 14, 2017.
(Continued)

*Primary Examiner* — Saad Khawar
(74) *Attorney, Agent, or Firm* — Ericsson Inc.

(57) ABSTRACT

A method performed by wireless device for handling communication in a wireless communication network is provided. The wireless device obtains an indication indicating control, when to initiate and/or when to stop, use of an additional filtering process for measurements on a beam level for including one or more measurements on a beam level in a measurement report. The wireless device applies the additional filtering based on the obtained indication.

7 Claims, 11 Drawing Sheets

(52) U.S. Cl.
CPC ....... *H04W 24/10* (2013.01); *H04W 36/0058* (2018.08); *H04W 36/0061* (2013.01); *H04W 36/0088* (2013.01)

(56) References Cited

OTHER PUBLICATIONS

Ericsson: "Measurement model in NR", 3GPP Draft; R2-1704100—Measurement Model in NR, 3rd Generation Partnership Project (3GPP), Mobile Competence Centre ; 650, Route Des Lucioles ; F-06921 , Sophia-Antipolis Cedex ; France. May 14, 2017.
ISR and Written Opinion from corresponding PCT Application PCTSE2018050562.

* cited by examiner

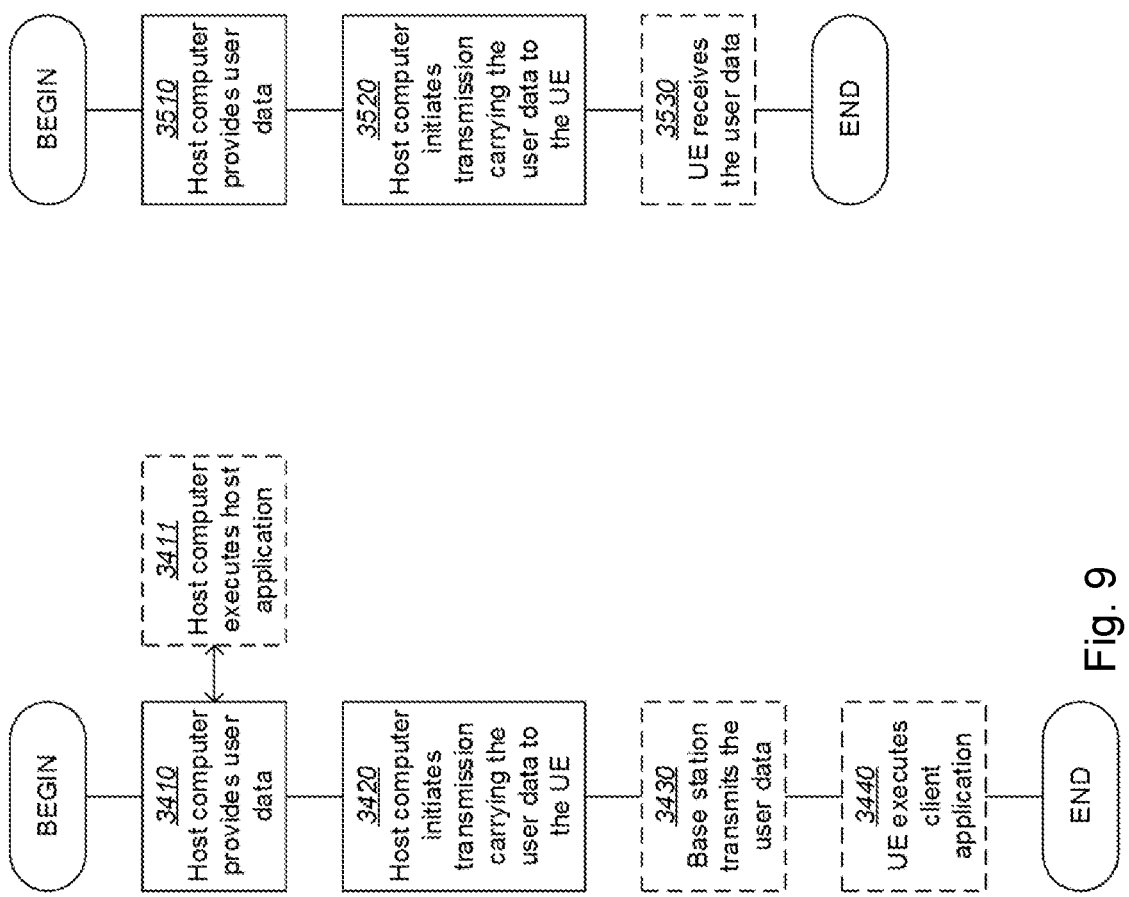

RADIO NETWORK NODE, WIRELESS DEVICE AND METHODS PERFORMED THEREIN

TECHNICAL FIELD

Embodiments herein relate to a radio network node, a wireless device and methods performed therein. Furthermore, a computer program and a computer readable storage medium are also provided herein. In particular, embodiments herein relate to enable communication of the wireless device e.g. handling measurements, in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks CN). The RAN covers a geographical area and provide radio coverage over service areas, which may also be referred to as a cell, a beam or a beam group, with each service area is served or controlled by a radio network node such as a radio access node e.g., a Wi-Fi access point or a radio base station (RBS), which in some networks may also be denoted, for example, a "NodeB" or "eNodeB" or "gNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

In NR, a measurement model according to FIG. 1 is likely to be agreed, at least partially.

A: measurements (beam specific samples) internal to the physical layer.

Layer 1 filtering: internal layer 1 (L1) filtering of the inputs measured at point A. Exact filtering is implementation dependent. How the measurements are actually executed in the physical layer by an implementation (inputs A and Layer 1 filtering) is not constrained by the standard.

$A^1$: Measurements (i.e. beam specific measurements) reported by layer 1 to layer 3 (L3) after layer 1 filtering.

Layer 3 filtering per beam: Filtering performed on the measurements provided at point $A^1$. The behaviour of the Layer 3 filters are standardised and the configuration of the layer 3 filters is provided by Radio Resource Control (RRC) signalling. It should be noted that L3 filtering for beam measurements may be referred to as e.g. L2 filtering.

Beam Consolidation/Selection: Beam measurements, also referred to as beam specific measurements, are consolidated to derive cell quality if N>1, else when N=1 the best beam measurement is selected to derive cell quality. The behaviour of the Beam consolidation/selection is standardised and the configuration of this module is provided by RRC signalling. Reporting period at B equals one measurement period at $A^1$.

Beam Selection for beam reporting: Beam measurements are consolidated to select the X best beams from which beam information is included in measurement reports. The behaviour of the beam selection is standardised and the configuration of this module is provided by RRC signalling.

Simplifications may be made and X may be configured as N (for cell quality derivation).

B: A measurement (i.e. cell quality) derived from beam-specific measurements reported to layer 3 after beam consolidation/selection.

Layer 3 filtering: Filtering performed on the measurements provided at point B. The behaviour of the Layer 3 filters are standardised and the configuration of the layer 3 filters is provided by RRC signalling. Filtering reporting period at C equals one measurement period at B.

C: A measurement after processing in the layer 3 filter. The reporting rate is identical to the reporting rate at point B. This measurement is used as input for one or more evaluation of reporting criteria.

Evaluation of reporting criteria: This checks whether actual measurement reporting is necessary at point D. The evaluation may be based on more than one flow of measurements at reference point C e.g. to compare between different measurements. This is illustrated by input C and $C^1$. The wireless device evaluates the reporting criteria at least every time a new measurement result is reported at point C, $C^1$. The reporting criteria are standardised and the configuration is provided by RRC signalling (wireless device measurements).

D: Measurement report information (message) sent on the radio interface.

Layer 1 filtering will introduce a certain level of measurement averaging. How and when the wireless device exactly performs the required measurements will be implementation specific to the point that the output at B fulfils the performance requirements as configured which are set by working group (WG) RAN4. Layer 3 filtering and parameters used are specified in the NR RRC specifications and does not introduce any delay in the sample availability between B and C. Measurement at point C, $C^1$ is the input used in an event evaluation.

In LTE, the wireless device always performs measurements on a serving cell(s). According to the RRC specifications, the wireless device performs reference signal received power (RSRP) and reference signal received quality (RSRQ) measurements for each serving cell, whenever the wireless device has a configured measurements behavior e.g. has a measConfig.

However, the wireless device does not immediately start to perform neighbor cell measurements, which may be costly from a wireless device power consumption perspective. Hence, in LTE, the wireless device may be configured with a threshold also referred to as an s-Measure threshold so that when a primary cell (PCell) RSRP, after layer 3 filtering, is lower than the threshold the wireless device may perform the measurements of neighbouring cells on the frequencies and Radio Access Technologies (RAT) indicated in a measurement configuration e.g. indicated in measObject.

One possible implementation to trigger the wireless device to start performing filtered measurements per beam with configurable filters, e.g., for the purpose of measurement reports, may be that the wireless device sets up a L3 filter for each beam that is detected at the L1 filtering. However, this may be extremely resource such AS processing and memory, hungry for the wireless device in a wireless communication network with many beams per cell as the UE needs to set up and perform L3 filtering for each of the beam although it will not be used in the beam level measurement reporting. It should be noted that 3GPP has agreed to support up to 64 beams per cell and the number could be even larger for channel state information-reference signal (CSI-RS) beams. Thus, this may lead to an inefficient usage of wireless device resources in terms of filtering function per beam.

SUMMARY

An object herein is to provide a mechanism that handles communication of a wireless communication network in an efficient manner.

According to an aspect the object is achieved by providing a method performed by wireless device for handling communication in a wireless communication network. The wireless device obtains an indication indicating control, when to initiate and/or when to stop, use of an additional filtering process for measurements on a beam level for including one or more measurements on a beam level in a measurement report. The wireless device applies the additional filtering based on the obtained indication. The wireless device may then generate a measurement report based on the additional filtering, and may transmit the generated measurement report to a radio network node in the wireless communication network.

According to another aspect the object is achieved by providing a method performed by a radio network node for handling communication in a wireless communication network. The radio network node transmits an indication to a wireless device, which indication indicates control, when to initiate and/or when to stop, use of an additional filtering process for measurements on a beam level for including one or more measurements on a beam level in a measurement report.

It is furthermore provided herein a computer program comprising instructions, which, when executed on at least one processor, cause the at least one processor to carry out any of the methods above, as performed by the wireless device or the radio network node. It is additionally provided herein a computer-readable storage medium, having stored thereon a computer program comprising instructions which, when executed on at least one processor, cause the at least one processor to carry out the method according to any of the methods above, as performed by the wireless device or the radio network node.

According to yet another aspect a radio network node and a wireless device are herein provided configured to perform the methods herein.

Embodiments herein provide a method to control a triggering or deactivation of the additional filtering process of measurements on a beam level. Thus, the wireless device may e.g. be triggered to perform the additional filtering process, or beam level measurements, in an efficient manner i.e. only perform the additional filtering process at a time measurements on a beam level are required to be included in the measurement report. Thus, the communication of the wireless communication network is handled in an efficient manner.

BRIEF DESCRIPTION OF THE DRAWINGS

Embodiments will now be described in more detail in relation to the enclosed drawings, in which:

FIGS. 9-12 are flowcharts illustrating methods implemented in a communication system including a host computer, a base station and a user equipment.

DETAILED DESCRIPTION

Figure 1:
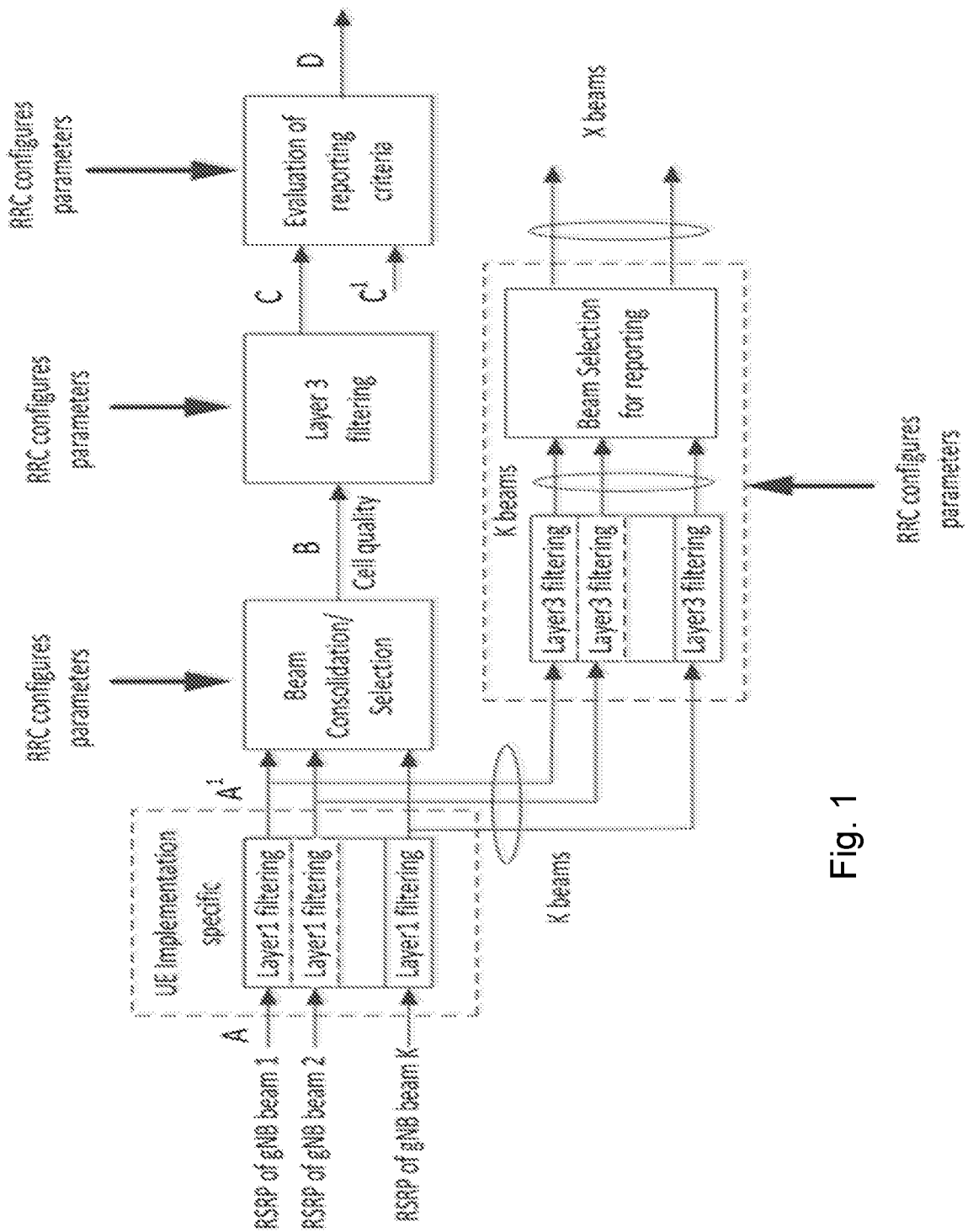
FIG. 1 is a schematic overview depicting a possible measurement model in NR.
Figure 2:
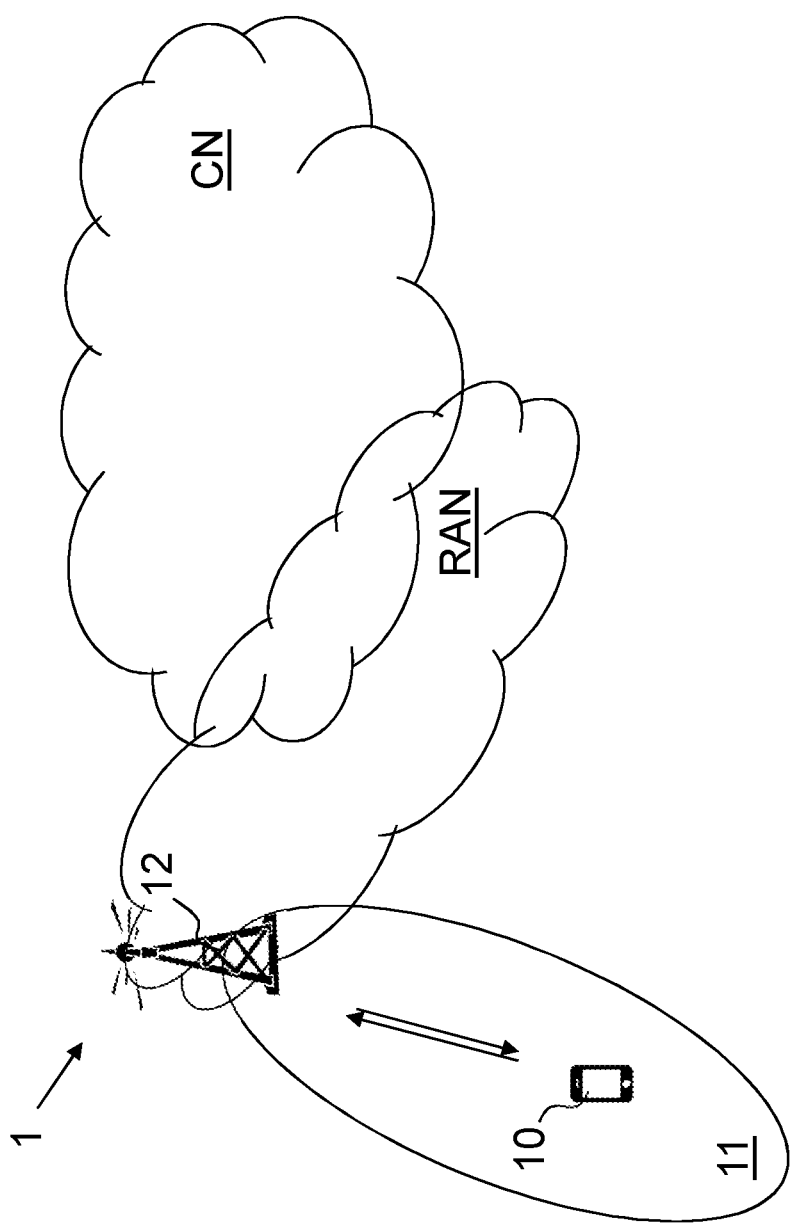
FIG. 2 is a schematic diagram depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a wireless device 10, such as a mobile station, a non-access point (non-AP) STA, a STA, a user equipment and/or a wireless terminals, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 communicates with the wireless device 10 with Downlink (DL) transmissions to the wireless device 10 and Uplink (UL) transmissions from the wireless device 10.

The wireless device 10 may be configured to perform layer 1 filtering and additional filtering, e.g. layer 3 filtering, on or for measurements on a cell level. According to embodiments herein the wireless device 10 obtains an indication, e.g. from a radio network node or in case of fulfilling a criterion, which indication indicates a control of an additional filtering process, such as L3-filtering process, for measurements on a beam level for including one or more measurements on a beam level in a measurement report. Control should be interpreted as initiate and/or stop the additional filtering process. Thus, the wireless device 10 may only perform the additional filtering process at a time measurements on a beam level are required to be included in the measurement report.

Figure 3:
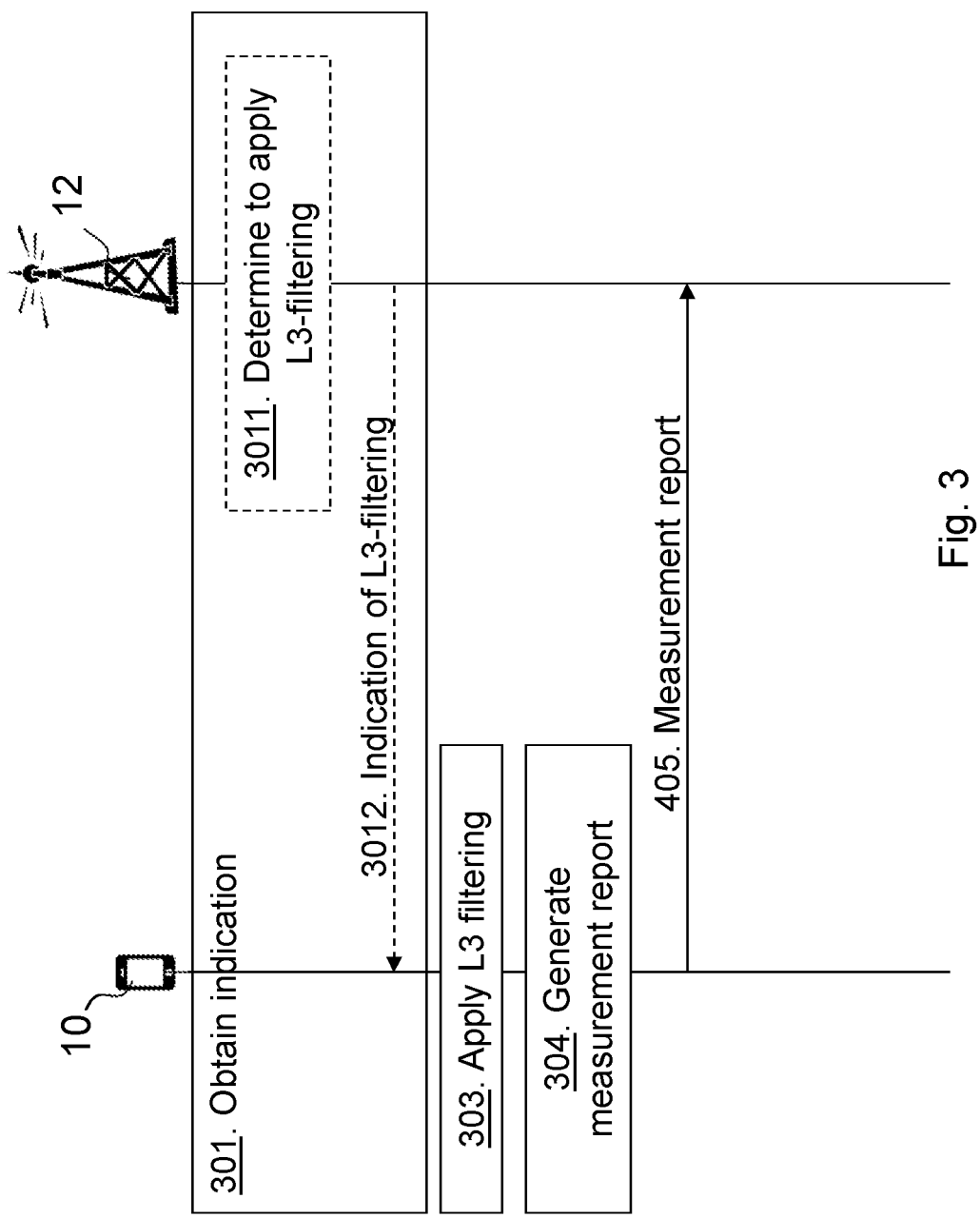
FIG. 3 is a combined flowchart and signalling scheme according to some embodiments herein.

FIG. 3 is a combined flowchart and signaling scheme according to some embodiments herein.

Action 301. The wireless device obtains the indication indicating the control, when to initiate and/or when to stop, of using the additional filtering process for measurements on a beam level for including the one or more measurements on a beam level in a measurement report.

Triggering of the Beam Level Filtering

Embodiments herein provide different triggering criteria to initiate the additional filtering process on measurements on a beam level, exemplified herein as a L3 filtering on measurements on a beam level, and thus the filtered beam level measurements, such as:

Reception of a message, from the radio network node 12, e.g. either an RRC message or a Media Access Control (MAC) control element (CE). This message may comprise a list of cells for which the L3 filtering should be initiated by the wireless device 10 and/or a list of beam indices for which the L3 filtering should be initiated by the wireless device 10;

The triggering of an event based on serving cell(s) level measurements.

For example, the wireless device 10 may perform cell quality measurements for a given serving cell A and, when the quality of that serving cell A goes below a certain threshold, Th1, the wireless device 10 starts to perform the L3 filtering on measurements on a beam level such as performing L3 filtered beam level measurements associated to that serving cell and/or other cells, other configured Secondary Cell(s) (SCell) and other neighbor cell(s) the wireless device 10 may already be measuring.

The triggering of an event based on neighbor cell(s) level measurements.

For example, the wireless device 10 may perform cell quality measurements for neighbor cells and, when the quality of at least one neighbor cell goes above a certain threshold, which may be relative to a serving cell level, the wireless device 10 starts to perform L3 filtering on measurements on a beam level associated to that particular cell and/or other neighbor cells that have been detected.

The triggering of an event based on relative quality between serving and neighbor cells, such as the triggering condition of A1-A6 events normally used for indicating handover, or C-like events, if CSI-RS is configured. For example, the wireless device 10 may perform cell quality measurements for serving and neighbor cells and, at each evaluation period, the wireless device 10 may compare between the qualities of these cells. Hence, the first time a given event is triggered, compared qualities fulfill a set threshold, the wireless device 10 starts to perform L3 filtering on measurements on a beam level and include these measurements in the next measurement report. These measurements may be started for:

The serving cell(s), which may be one, e.g. PCell only, or multiple, in the case of SCells;

Triggered cells, such as cells that triggered the configured event;

Non-triggered cells, such as detected cells that were not within the subset of cells that triggered the events;

Cells in a white list, explicitly configured for that purpose or another type of white list, also used for other purposes e.g. to be applicable cells for triggering measurement events. A white list when used herein means the cells in this list are used for the event evaluation or the measurement reporting by the wireless device 10.

K strongest cells, where K is configurable;

Any combination of these cell types mentioned above.

In this scheme it could be further seen that the wireless device starts L3 filtering when the cell level measurements satisfy the event entering condition and when a Time To Trigger (TTT) is triggered, so that there is some time for beam level filtering when the TTT is running.

Stopping of the Beam Level Filtering

The indication may indicate when to stop the additional filtering process. One purpose of these filtered measurements on a beam level is their inclusion in measurement reports. Hence, embodiments provide an efficient manner to start L3 filtered measurement on beam level when events are close to be triggered and to stop measuring when a leaving condition of the events are triggered i.e. the wireless device 10 stops to send measurement reports. Hence, in the same way triggering to initiate the L3 filtered measurement on beam level are defined, triggering to stop these L3 filtered measurement on beam level may also be defined. Hence, multiple embodiments comprise different triggering criteria to stop the L3 filtered measurement on beam level at the wireless device 10, such as:

Reception of a message from the radio network node 12 (either an RRC message of a MAC CE), This message could involve a list of cells for which the L3 filtering process should be stopped by the wireless device and/or this message may comprise a list of beam indices for which the L3 filtering on measurements on a beam level should be stopped by the wireless device 10.

The triggering of an event based on serving cell(s) level measurements.

For example, the wireless device 10 may perform cell quality measurements for a given serving cell A and filtered beam level measurements for that cell and, when the quality of that serving cell A goes above a certain threshold and the wireless device 10 stops to perform L3 filtering on measurements on a beam level associated to that particular cell and/or other cells that may also be performing L3 filtering on measurements on a beam level i.e. filtered beam level measurements.

The triggering of an event based on neighbor cell(s) level measurements.

For example, the wireless device 10 may perform cell quality measurements and L3 filtering on measurements on a beam level for neighbor cells and, when the quality of at least one neighbor cell goes above a certain threshold, which may be relative to the serving cell quality, the wireless device 10 stops to perform L3 filtering on measurements on a beam level associated to that particular cell and/or other neighbor cells whose cell has been detected and/or serving cell(s).

The triggering of an event based on relative quality between serving and neighbor cells, such as the triggering of leaving condition of A1-A6 events (Or C-like events, if CSI-RS is configured).

For example, the wireless device 10 may perform cell quality measurements for serving and neighbor cells and, at each evaluation period, the wireless device 10 may compare between the quality of these cells. The wireless device 10 may also perform beam level measurements on these cells when a leaving condition for a configured event is triggered. Then, the wireless device 10 stops to perform beam level measurements, i.e. L3 filtering on measurements on a beam level. These measurements may be stopped for:

The serving cell(s), which may be one (e.g. PCell only) or multiple (in the case of SCells);

Triggered cells (cells that triggered the configured event);

Non-triggered cells (detected cells that were not within the subset of cells that triggered the events);

Cells in the white list, explicitly configured for that purpose or another type of white list, also used for other purposes e.g. to be applicable cells for triggering measurement events;

K strongest cells;

Any combination of these cell types.

The control may be configured by the network such as the radio network node 12. In that case, the radio network node 12 may provide the wireless device 10 with parameters controlling the triggering point described above i.e. the triggering point from which the wireless device 10 should start to perform these filtered beam level measurements.

Action 3011. The radio network node 12 may determine to control L3 filtering on measurements on a beam level, e.g. activate or stop L3 filtering on measurements on a beam level.

Details of Beam Level Filtering Options Described Above

Action 3012. In one embodiment the radio network node 12 may send a message to the wireless device 10 so that upon reception the wireless device 10 initiates L3 filtering on measurements on a beam level i.e. filtered beam level measurements. The message may comprise at least one of:

Indication to start to perform L3 filtering on measurements on a beam level for all detected cells, starting from the cells with the strongest cell quality until the wireless device capability to maintain beam level measurements is reached;

Configurable filter parameters for filtered beam level measurements e.g. L3 and/or L2 filter parameters;

No explicit indication related to that, although the reception of the message sent for other purposes, i.e. an implicit indication, e.g. configure cell level measurements, may also be used to indicate that the wireless device 10 should start to perform L3 filtering on measurements on a beam level;

Measurement data such as Specific measurement identities, measurement objects and/or reporting configuration which the wireless device may consider when starting the measurements. For example, the measurement data may be provided only for a given measurement ID associated to a given measurement object known to require these measurements, which may be triggered differently compared to other measurement objects and/or measurement identities.

The message described in the first embodiment may be an RRC message (e.g. RRCConnection Reconfiguration) and/or optional Information element (IE) within an RRC message (e.g. part of the MeasConfig). The message and/or indication may also be a specific MAC Control Element that triggers the wireless device 10 to initiate filtered beam level measurements.

In a second embodiment, the wireless device 10 is configured with triggering conditions so that when the triggering conditions are fulfilled the wireless device 10 initiates L3 filtering on measurements on a beam level. These triggering conditions may be any of the previously described conditions related to the serving and/or neighbor cell quality and/or the triggering of a measurement events e.g. A1-A6 or the relative quality between serving and neighbor cell(s). Upon receiving that message L3 filtering on measurements on a beam level is not initiated but the triggering conditions are applied.

The message described in the second embodiment may be an RRC message (e.g. RRCConnection Reconfiguration) and/or optional parameter within an RRC message (e.g. part of the MeasConfig).

The message and/or indication may also be a specific MAC Control Element that triggers the wireless device 10 to stop L3 filtering on measurements on a beam level i.e. filtered beam level measurements.

In some embodiments the radio network node 12 may send a message to the wireless device 10 so that upon reception the wireless device 10 initiates filtered beam level measurements. Another criteria may be that after X measurement reports are transmitted the wireless device starts filtered beam level measurements. The wireless device 10 receives CSI-RS measurement configuration but only starts to measure when the event, e.g. Synchronization Signal Block (SSB) event, is triggered.

The wireless device 10 may be configured to measure also CSI-RS in a measurement configuration. The related measurement object may have measurement identity linking the Measurement Objects (MO) to two different reporting configurations, one for SSB and one CSI-RS. The trigger to start measuring and filtering a specific CSI-RS might be the following:

Cell ID to which the CSI-RS is belonging to trigger SSB event or has CSI-RS filtering specific threshold for SSB that is triggered.

Action 302. The wireless device 10 then applies the additional filtering based on the obtained indication.

Action 303. The wireless device 10 may then generate a measurement report based on the additional filtering.

Action 304. The wireless device 10 may further transmit the generated measurement report to the radio network node 12 in the wireless communication network.

Figure 4A:
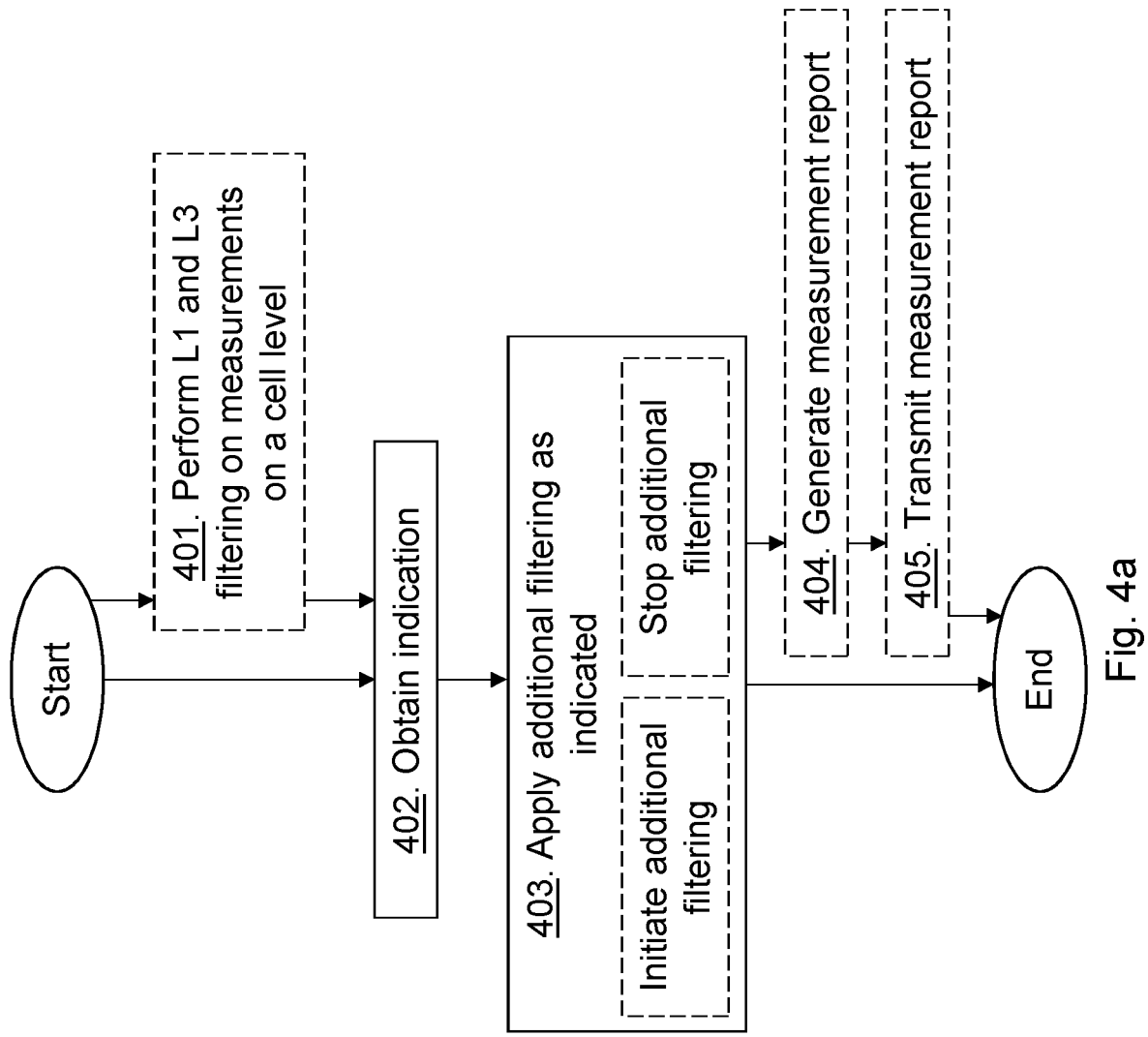
FIG. 4a is a flowchart depicting a method performed by a wireless device according to embodiments herein.

The method actions performed by the wireless device 10 for handling communication in the communication network 1 according to some embodiments will now be described with reference to a flowchart depicted in FIG. 4a. The actions do not have to be taken in the order stated below, but may be taken in any suitable order. Actions performed in some embodiments are marked with dashed boxes.

Action 401. The wireless device 10 may perform layer 1 filtering on or for measurements on a beam level and/or a cell level and additional filtering, e.g. layer 3 filtering, on or for measurements on a cell level.

Action 402. The wireless device 10 obtains the indication indicating control, when to initiate and/or when to stop, use of the additional filtering process for measurements on a beam level for including one or more measurements on a beam level in a measurement report.

Action 403. The wireless device applies the additional filtering based on the obtained indication. E.g. the wireless device 10 may initiate or activate performing additional filtering process for measurements on a beam level in case the indication indicates an initiation and/or the wireless device 10 may stop performing additional filtering process for measurements on a beam level in case the indication indicates a stop.

In some embodiments, the indication indicating control is represented by triggering criteria, to initiate the additional filtering process on measurements on a beam level is represented by to initiate Layer 3, L3, filtering on measurements on a beam level, and the control relates to when to initiate the L3 filtering on measurements on a beam level. In these embodiments, the triggering criteria comprises any one out of:

a reception of a message from the radio network node 12 comprising any one out of: a list of cells for which the L3 filtering should be initiated by the wireless device 10, and a list of beam indices for which the L3 filtering should be initiated by the wireless device 10, an event based on serving cells level measurements.

an event based on neighbour cells level measurements, an event based on relative quality between serving and neighbours cells, In some embodiments, the triggering criteria comprises an event based on serving cells level measurements. The applying of the additional filtering based on the obtained indication may then comprise:

Performing cell quality measurements for a serving cell and, when the quality of that serving cell goes below a threshold, starting to perform the L3 filtering on measurements on a beam level associated to any one out of: the serving cell, other cells, other configured Secondary Cells, SCells, and other neighbour cells the wireless device 10 may already be measuring.

In some embodiments the triggering criteria comprises an event based on neighbour cells level measurements, The applying of the additional filtering based on the obtained indication may then comprise:

Performing cell quality measurements for neighbour cells and, when the quality of at least one neighbour cell goes above a threshold, starting to perform L3 filtering on measurements on a beam level associated to that particular cell and/or other neighbour cells that have been detected.

In some embodiments, the triggering criteria comprises an event based on relative quality between serving and neighbours cells.

The applying of the additional filtering based on the obtained indication may then comprise:

Performing cell quality measurements for serving and neighbour cells and, at each evaluation period, comparing between the qualities of these cells, and when compared qualities fulfil a threshold, starting to perform L3 filtering on measurements on a beam level such as for beams associated to those two cells and/or other neighbour cells In some embodiments, the indication indicating control is represented by triggering criteria, to initiate the additional filtering process on measurements on a beam level is represented by to initiate Layer 3, L3, filtering on measurements on a beam level, and the control relates to when to stop the L3 filtering on measurements on a beam level.

In these embodiments, the triggering criteria may comprise any one out of:

A reception of a message from the radio network node 12 comprising any one out of: a list of cells for which the L3 filtering should be stopped by the wireless device 10, and a list of beam indices for which the L3 filtering should be initiated by the wireless device 10, An event based on serving cells level measurements, An event based on neighbour cells level measurements, and An event based on relative quality between serving and neighbours cells, In some embodiments, the triggering criteria comprises an event based on serving cells level measurements.

The applying of the additional filtering based on the obtained indication may then comprise:

Performing cell quality measurements for a serving cell and, when the quality of that serving cell goes above a threshold, stopping to perform the L3 filtering on measurements on a beam level associated to any one out of: the serving cell, other cells, other configured Secondary Cells, SCells, and other neighbor cells the wireless device 10 may already be measuring.

In some embodiments, the triggering criteria may comprise an event based on neighbour cells level measurements.

The applying of the additional filtering based on the obtained indication may then comprise:

Performing cell quality measurements for neighbour cells and, when the quality of at least one neighbour cell goes below a threshold, stopping to perform L3 filtering on measurements on a beam level associated to that particular cell and/or other neighbour cells that have been detected.

In some embodiments, the triggering criteria may comprise an event based on relative quality between serving and neighbours cells.

The applying of the additional filtering based on the obtained indication may then comprise: When the event comprises that a leaving condition is triggered, stopping to perform L3 filtering on measurements on a beam level.

Action 404. The wireless device 10 may then generate a measurement report based on the additional filtering, i.e. the wireless device 10 performs measurements that are filtered using the additional filtering process for measurements on a beam level. The measurement report may then be generated by adding filtered beam level measurements into the report.

Action 405. The wireless device 10 may further transmit the generated measurement report to the radio network node 12 in the wireless communication network.

Figure 4B:
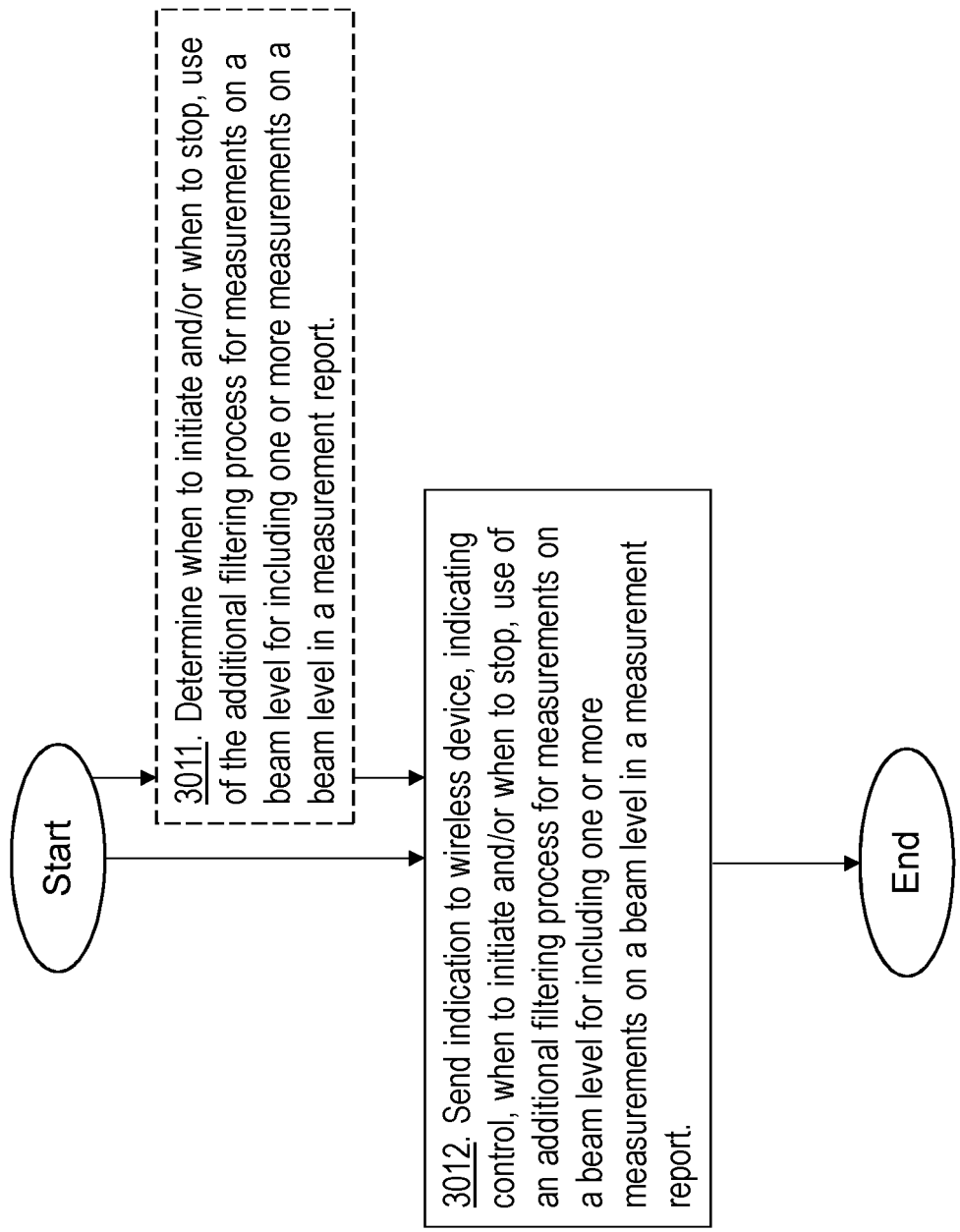
FIG. 4b is a flowchart depicting a method performed by a radio network node according to embodiments herein.

The method actions performed by the radio network node 12 for handling communication in the communication network 1 according to some embodiments will now be described with reference to a flowchart depicted in FIG. 4*b*. FIG. 4*b* depicts some of the method actions from FIG. 3 as described above. Actions performed in some embodiments are marked with dashed boxes.

Action 3011.

In some embodiments, the radio network node 12 determines 3011 when to initiate and/or when to stop, use of the additional filtering process for measurements on a beam level for including one or more measurements on a beam level in a measurement report. The radio network node 12 may then send an indication about the determination to the wireless device 12.

Action 3012.

The radio network node 12 sends an indication, to the wireless device 10. The indication indicates control, when to initiate and/or when to stop, use of an additional filtering process for measurements on a beam level for including one or more measurements on a beam level in a measurement report, e.g. determined by the radio network node 12.

In some embodiments, the additional filtering process for measurements on a beam level may be represented by Layer 3, L3, filtering on measurements on a beam level. The indication may be comprised in a message comprising at least one of:

an indication to start to perform L3 filtering on measurements on a beam level for all detected cells, by starting from the cells with the strongest cell quality until the wireless device capability to maintain beam level measurements is reached;

configurable filter parameters for filtered beam level measurements of L3 and/or L2 filter parameters;

no explicit indication related to that, although the reception of the message sent for other purposes is also used to indicate that the wireless device 10 shall start to perform L3 filtering on measurements on a beam level; and measurement data comprising any one out of: Specific measurement identities, measurement objects, and reporting configuration to be considered by the wireless device 10 when starting the measurements.

Thus, according to embodiments herein it is provided an additional filter for beam-level measurements for the purpose of including beam-level measurements in measurement reports.

Figure 5:
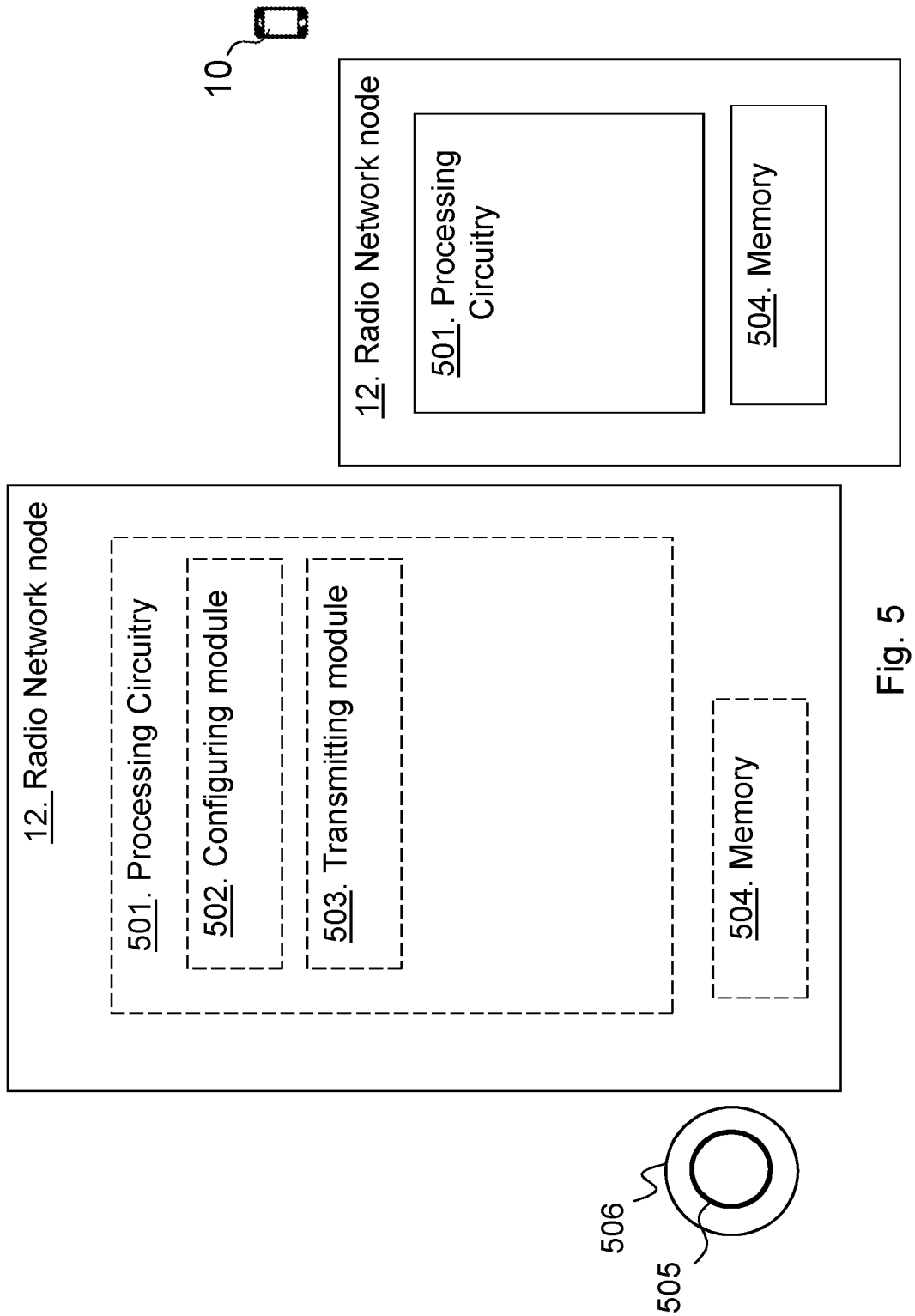
FIG. 5 is a schematic block diagram depicting a radio network node according to embodiments herein.

FIG. 5 is a schematic block diagram depicting the radio network node 12, in two embodiments, for enabling communication e.g. configuring the wireless device, for the wireless device 10 in the wireless communication network 1.

The radio network node 12 may comprise a processing circuitry 501, e.g. one or more processors, configured to perform the methods herein.

The radio network node 12 may comprise a configuring module 502. The radio network node 12, the processing circuitry 501, and/or the configuring module 502 may be configured to configure the wireless device 10 with configuration data indicating events or criteria for controlling additional filtering process for measurements on a beam level at the wireless device 10.

The radio network node 12 may comprise a transmitting module 503, e.g. a transmitter, a transceiver, or similar. The radio network node 12, the processing circuitry 501, and/or the transmitting module 503 is configured to transmit the indication to the wireless device 10.

The radio network node 12 further comprises a memory 504 comprising one or more memory units. The memory 504 comprises instructions executable by the processing circuitry 501 to perform the methods herein when being executed in the radio network node 12. The memory 504 is arranged to be used to store e.g. information, data such as configuration data, indications, scheduling information, beamforming parameters, etc.

The methods according to the embodiments described herein for the radio network node 12 are respectively implemented by means of e.g. a computer program 505 or a computer program product, comprising instructions, i.e., software code portions, which, when executed on at least one processor, cause the at least one processor to carry out the actions described herein, as performed by the radio network node 12. The computer program 505 may be stored on a computer-readable storage medium 506, e.g. a disc, a USB, or similar. The computer-readable storage medium 506, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium. Thus, the radio network node 12 may comprise the processing circuitry and the memory, said memory comprising instructions executable by said processing circuitry whereby said radio network node is operative to perform the methods herein.

The radio network node 12 for handling communication in a wireless communication network 1 depicted in FIG. 5 may comprises the following arrangement.

The radio network node 12 is configured to send, e.g. by means of the transmitting module 503, an indication to a wireless device 10. The indication indicates control, when to initiate and/or when to stop, use of an additional filtering process for measurements on a beam level for including one or more measurements on a beam level in a measurement report.

The radio network node 12 is configured to determine, e.g. by means of the processing circuitry 501, when to initiate and/or when to stop, use of the additional filtering process for measurements on a beam level for including one or more measurements on a beam level in a measurement report.

In some embodiments, the additional filtering process for measurements on a beam level may be adapted to be represented by Layer 3, L3, filtering on measurements on a beam level. In these embodiments, the indication may be adapted to be comprised in a message comprising at least one of:

An indication to start to perform L3 filtering on measurements on a beam level for all detected cells, by starting from the cells with the strongest cell quality until the wireless device capability to maintain beam level measurements is reached;

configurable filter parameters for filtered beam level measurements of L3 and/or L2 filter parameters;

no explicit indication related to that, although the reception of the message sent for other purposes is also used to indicate that the wireless device 10 shall start to perform L3 filtering on measurements on a beam level; and measurement data comprising any one out of: Specific measurement identities, measurement objects, and reporting configuration to be considered by the wireless device 10 when starting the measurements.

Figure 6:
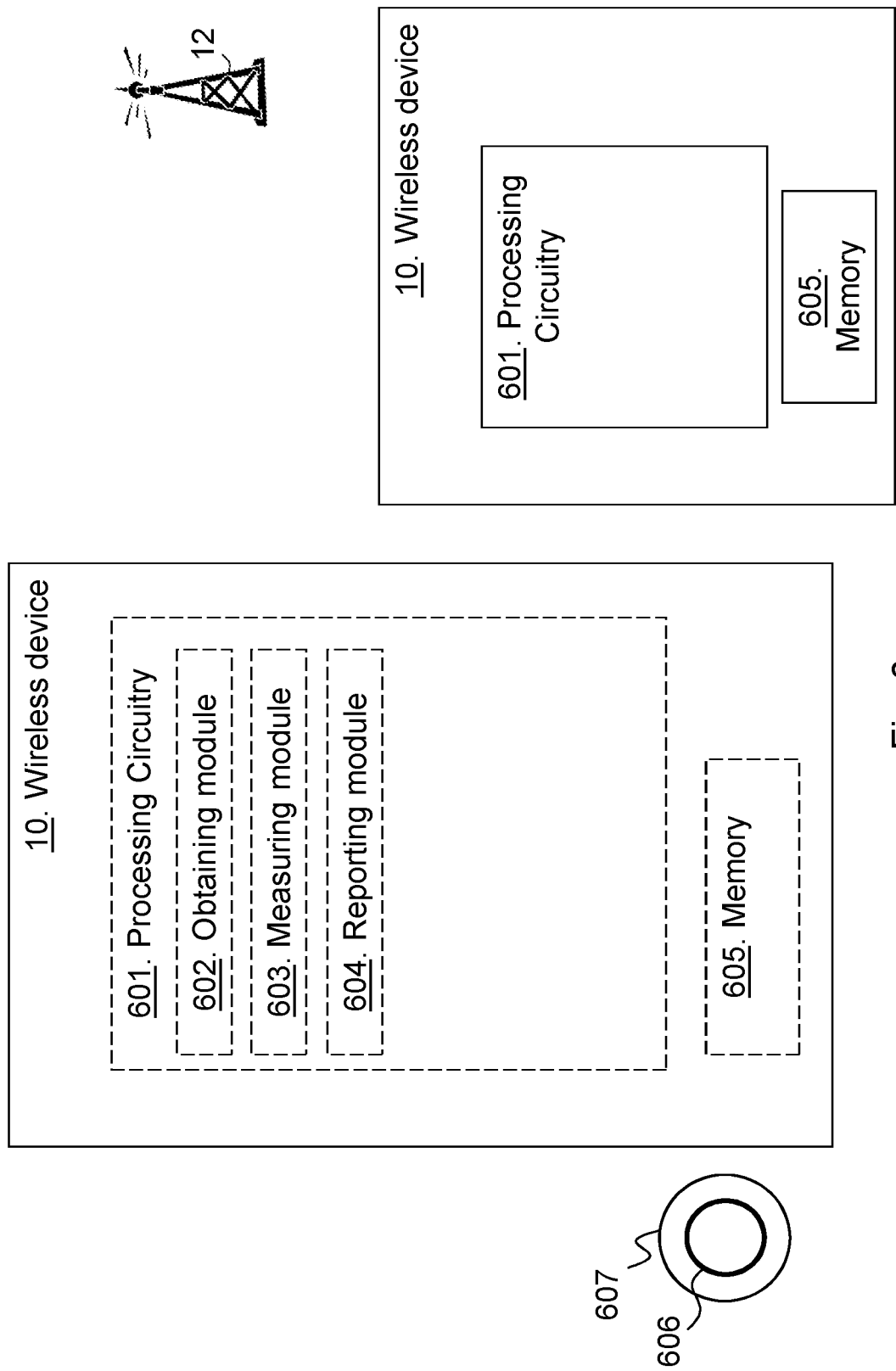
FIG. 6 is a schematic block diagram depicting a wireless device according to embodiments herein.

FIG. 6 is a schematic block diagram depicting the wireless device 10, in two embodiments, for handling communication in the wireless communication network.

The wireless device 10 may comprise a processing circuitry 601, e.g. one or more processors, configured to perform the methods herein.

The wireless device 10 may comprise an obtaining module 602. The wireless device 10, the processing circuitry 601, and/or the obtaining module 602 may be configured to obtain the indication.

The wireless device 10 may comprise a measuring module 603. The wireless device 10, the processing circuitry 601, and/or the measuring module 803 is configured, apply the additional filtering according to the indication.

The wireless device 10 may comprise a reporting module 604. The wireless device 10, the processing circuitry 601, and/or the reporting module 604 may be configured to generate and transmit the measurement report.

The wireless device 10 further comprises a memory 605 comprising one or more memory units. The memory 605 comprises instructions executable by the processing circuitry 601 to perform the methods herein when being executed in the wireless device 10. The memory 605 is arranged to be used to store e.g. information, data such as configurations, indications, measurements, etc.

The methods according to the embodiments described herein for the wireless device 10 are respectively implemented by means of e.g. a computer program 606 or a computer program product, comprising instructions, i.e., software code portions, which, when executed on at least one processor, cause the at least one processor to carry out the actions described herein, as performed by the wireless device 10. The computer program 606 may be stored on a computer-readable storage medium 607, e.g. a disc, a USB or similar. The computer-readable storage medium 607, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of communications receivers will appreciate the cost, performance, and maintenance trade-offs inherent in these design choices.

The wireless device 10 for handling communication in a wireless communication network 1 depicted in FIG. 6 may comprises the following arrangement.

The wireless device 10 is configured to obtain, e.g. by means of the obtaining module 602, an indication indicating control, when to initiate and/or when to stop, use of an additional filtering process for measurements on a beam level for including one or more measurements on a beam level in a measurement report.

The wireless device 10 is configured to apply, e.g. by means of the obtaining module 602, the additional filtering based on the obtained indication.

The wireless device 10 may further be configured to generate, e.g. by means of the reporting module 604, a measurement report based on the additional filtering and transmit the generated measurement report to a radio network node 12 in the wireless communication network 1.

In some embodiments, the indication indicating control is adapted to be represented by triggering criteria. In some of these embodiments, to initiate the additional filtering process on measurements on a beam level is adapted to be represented by to initiate Layer 3, L3, filtering on measurements on a beam level, and the control may be adapted to relate to when to initiate the L3 filtering on measurements on a beam level.

The triggering criteria may then be adapted to comprise any one out of:

A reception of a message from the radio network node 12 comprising any one out of: a list of cells for which the L3 filtering should be initiated by the wireless device 10, and a list of beam indices for which the L3 filtering should be initiated by the wireless device 10, an event based on serving cells level measurements.

an event based on neighbour cells level measurements, and an event based on relative quality between serving and neighbours cells, In some embodiments, the triggering criteria is adapted to comprise an event based on serving cells level measurements. In some of these embodiments, the wireless device 10 is further configured to apply the additional filtering based on the obtained indication by: performing cell quality measurements for a serving cell and, when the quality of that serving cell goes below a threshold, start to perform the L3 filtering on measurements on a beam level associated to any one out of: the serving cell, other cells, other configured Secondary Cells, SCells, and other neighbor cells the wireless device 10 may already be measuring.

In some embodiments, the triggering criteria is adapted to comprise an event based on neighbour cells level measurements. In some of these embodiments, the wireless device 10 may further be configured to apply the additional filtering based on the obtained indication by:

Performing cell quality measurements for neighbor cells and, when the quality of at least one neighbor cell goes above a threshold, start to perform L3 filtering on measurements on a beam level associated to that particular cell and/or other neighbor cells that have been detected.

In some embodiments, the triggering criteria is adapted to comprise an event based on relative quality between serving and neighbor cells. In some of these embodiments, the wireless device 10 may further be configured to apply the additional filtering based on the obtained indication by:

Performing cell quality measurements for serving and neighbor cells and, at each evaluation period, compare between the qualities of these cells, and when compared qualities fulfil a threshold, start to perform L3 filtering on measurements on a beam level.

In some embodiments, wherein the indication indicating control is adapted to be represented by triggering criteria, wherein to initiate the additional filtering process on measurements on a beam level is adapted to be represented by to initiate Layer 3, L3, filtering on measurements on a beam level, and wherein the control adapted to relate to when to stop the L3 filtering on measurements on a beam level, and wherein the triggering criteria is adapted to comprise any one out of:

A reception of a message from the radio network node 12 comprising any one out of: a list of cells for which the L3 filtering should be stopped by the wireless device 10, and a list of beam indices for which the L3 filtering should be initiated by the wireless device 10, an event based on serving cells level measurements, an event based on neighbour cells level measurements, an event based on relative quality between serving and neighbours cells, In some embodiments, the triggering criteria is adapted to comprise an event based on serving cells level measurements. In some of these embodiments, the wireless device 10 may further be configured to apply the additional filtering based on the obtained by: Performing cell quality measurements for a serving cell and, when the quality of that serving cell goes above a threshold, stop to perform the L3 filtering on measurements on a beam level associated to any one out of: the serving cell, other cells, other configured Secondary Cells, SCells, and other neighbor cells the wireless device 10 may already be measuring.

In some embodiments, the triggering criteria is adapted to comprise an event based on neighbour cells level measurements. In some of these embodiments, the wireless device 10 may further be configured to apply the additional filtering based on the obtained indication by: Performing cell quality measurements for neighbor cells and, when the quality of at least one neighbor cell goes below a threshold, stop to perform L3 filtering on measurements on a beam level associated to that particular cell and/or other neighbor cells that have been detected.

In some embodiments, the triggering criteria is adapted to comprise an event based on relative quality between serving and neighbours cells. In some of these embodiments, the wireless device 10 may further be configured to apply the additional filtering based on the obtained by: When the event comprises that a leaving condition is triggered, stopping to perform L3 filtering on measurements on a beam level.

Figure 7:
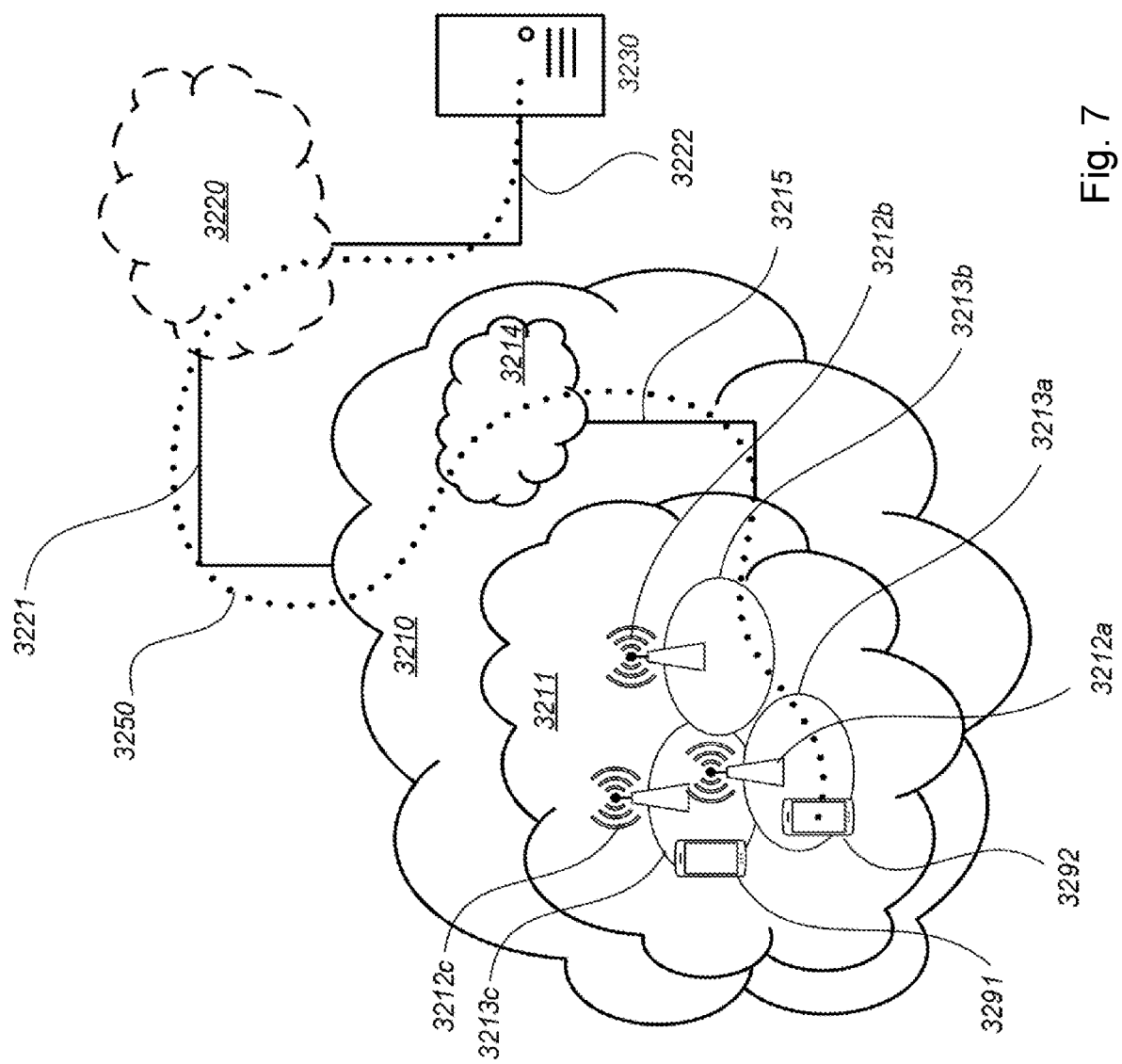
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
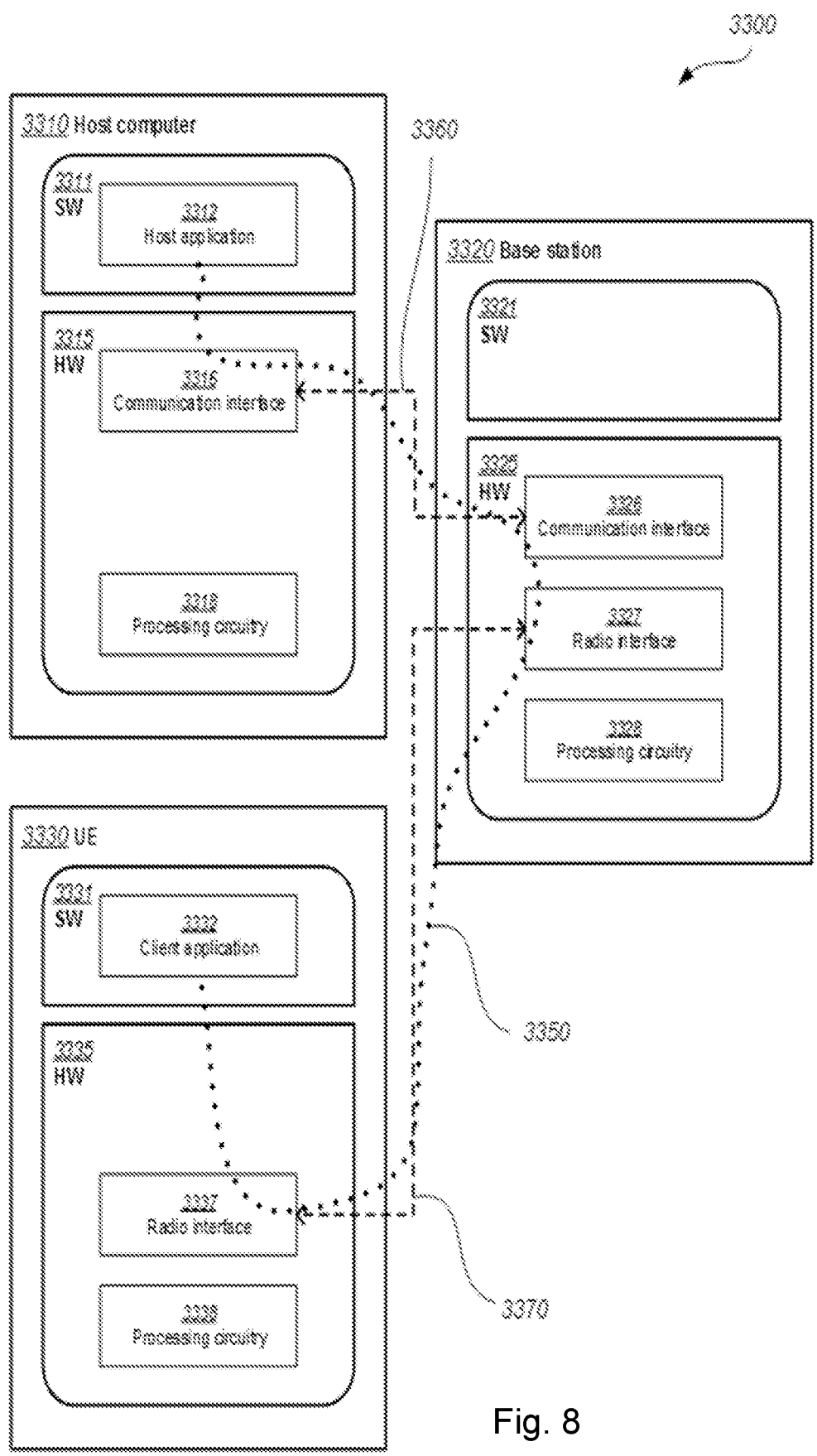
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve usage of resources that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
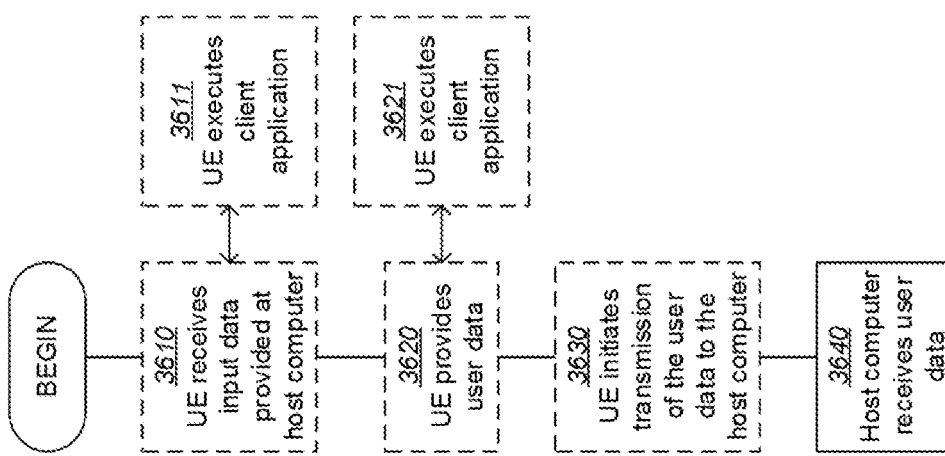

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
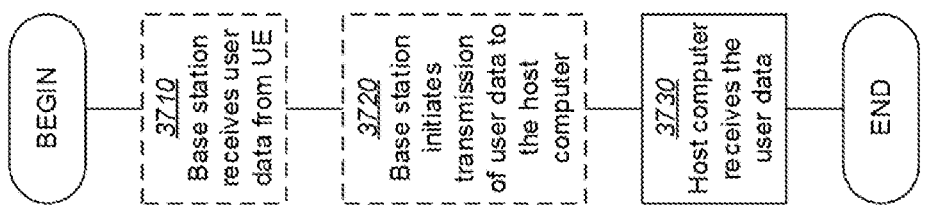

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a wireless device for handling communication in a wireless communication network, the method comprising:
   obtaining an indication indicating control when to initiate, and when to stop use of an additional filtering process for one or more measurements on a beam level for including one or more of the measurements on the beam level in a measurement report, the additional filtering process being a Layer 3 (L3) filtering process;
   applying the additional filtering based on the obtained indication; and
   generating the measurement report based on the additional filtering,
   wherein the indication indicating control is represented by triggering criteria, wherein to initiate the additional L3 filtering process on the one or more measurements on the beam level is represented by initiate L3 filtering on the one or more measurements on the beam level, and wherein the control relates to when to initiate the L3 filtering on the one or more measurements on the beam level, and
   wherein the triggering criteria to initiate comprises any one out of:
      reception of a message from the radio network node comprising any one out of: a list of cells for which the L3 filtering should be initiated by the wireless device, and a list of beam indices for which the L3 filtering should be initiated by the wireless device,
      an event based on serving cell(s) level measurements,
      an event based on neighbor cell(s) level measurements,
      an event based on relative quality between the serving and the neighbor cell(s),
   wherein to stop the additional L3 filtering process on the one or more measurements on the beam level is represented by to stop the L3 filtering on the one or more measurements on the beam level, and wherein the control relates to when to stop the L3 filtering on the one or more measurements on the beam level, and wherein the triggering criteria to stop comprises any one out of:
reception of a message from the radio network node comprising any one out of: a list of cells for which the L3 filtering should be stopped by the wireless device, and a list of beam indices for which the L3 filtering should be stopped by the wireless device,
an event based on serving cell(s) level measurements,
an event based on neighbor cell(s) level measurements,
an event based on relative quality between the serving and the neighbor cell(s).

2. The method according to any of the claim 1, further comprising:
transmitting the generated measurement report to a radio network node in the wireless communication network.

3. The method according to claim 1, wherein:
wherein the triggering criteria comprises an event based on the serving cell(s) level measurements, and
wherein applying the additional filtering based on the obtained indication comprises:
performing cell quality measurements for a serving cell and,
when the quality of that serving cell goes below a threshold, starting to perform the L3 filtering on the one or more measurements on the beam level associated to any one out of: the serving cell, other cells, other configured Secondary Cell(s), SCells, and other neighbor cell(s) the wireless device may already be measuring.

4. The method according to claim 1, wherein:
wherein the triggering criteria comprises an event based on the neighbor cell(s) level measurements, and
wherein applying the additional filtering based on the obtained indication comprises:
performing cell quality measurements for neighbor cell(s) and,
when the quality of at least one neighbor cell goes above a threshold, starting to perform L3 filtering on the one or more measurements on the beam level associated to that particular cell and/or other neighbor cell(s) that have been detected.

5. The method according to claim 1,
wherein the triggering criteria comprises an event based on relative quality between the serving and the neighbor cell(s), and
wherein applying the additional filtering based on the obtained indication comprises:
performing cell quality measurements for the serving and the neighbor cell(s) and, at each evaluation period, comparing between the qualities of these cells, and when compared qualities fulfill a threshold, starting to perform L3 filtering on the one or more measurements on the beam level.

6. The method according to claim 1,
wherein the triggering criteria comprises an event based on the serving cell(s) level measurements, and
wherein applying the additional filtering based on the obtained indication comprises:
performing cell quality measurements for a serving cell and,
when the quality of that serving cell goes above a threshold, stopping to perform the L3 filtering on the one or more measurements on the beam level associated to any one out of: the serving cell, other cells, other configured Secondary Cell(s), SCells, and other neighbor cell(s) the wireless device may already be measuring.

7. The method according to claim 1,
wherein the triggering criteria comprises an event based on the neighbor cell(s) level measurements, and
wherein applying the additional filtering based on the obtained indication comprises:
performing cell quality measurements for neighbor cell(s) and,
when the quality of at least one neighbor cell goes below a threshold, stopping to perform L3 filtering on the one or more measurements on the beam level associated to that particular cell and/or other neighbor cell(s) that have been detected.

* * * * *